United States Patent
Nelson

[15] 3,670,770
[45] June 20, 1972

[54] FLUID LINE COUPLING

[72] Inventor: Vaughn A. Nelson, Downers Grove, Ill.

[73] Assignee: International Harvester Company, Chicago, Ill.

[22] Filed: May 1, 1970

[21] Appl. No.: 33,757

[52] U.S. Cl..............137/614.04, 137/614.05, 137/614.02
[51] Int. Cl...........................................................F16k 11/00
[58] Field of Search.................137/614.04, 614.02, 614.06, 137/614.03, 614.05

[56] References Cited

UNITED STATES PATENTS

| | | |
|---|---|---|
| 3,498,324 | 3/1970 | Breuning............................137/614.04 |
| 3,374,985 | 3/1968 | Gessic...............................137/614.04 |
| 3,570,543 | 3/1971 | Bror..................................137/614.04 |
| 2,509,444 | 5/1950 | Mitchell............................137/614.04 |
| 2,533,640 | 12/1950 | Ulrich...............................137/614.04 |

Primary Examiner—Alan Cohan
Assistant Examiner—William H. Wright
Attorney—Floyd B. Harman

[57] ABSTRACT

A telescopic linear type fluid line coupling having a valved female housing carrying reciprocable sealing means, and a camming surface, a valved male coupling element having cam means thereon, said cam means and said camming surface being cooperative to effectuate interconnection of said male and female portions.

12 Claims, 7 Drawing Figures

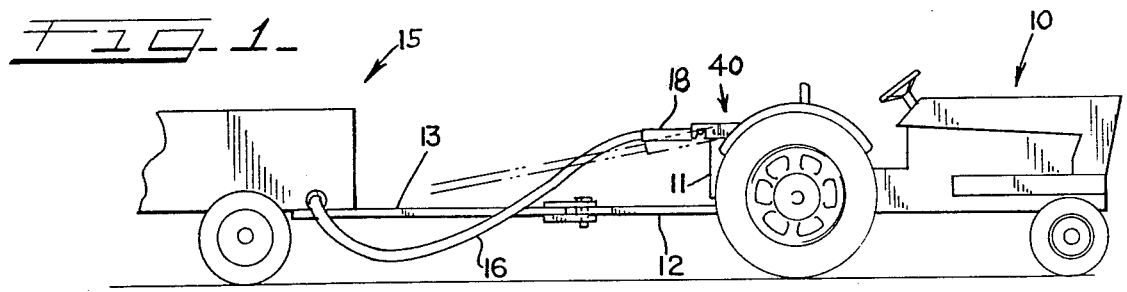
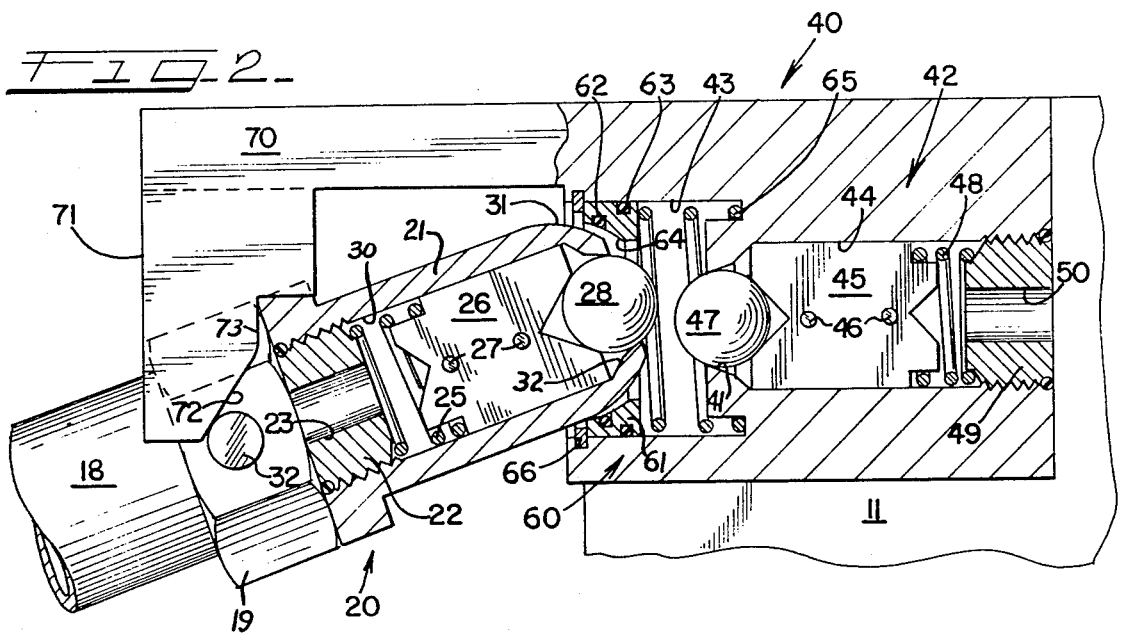
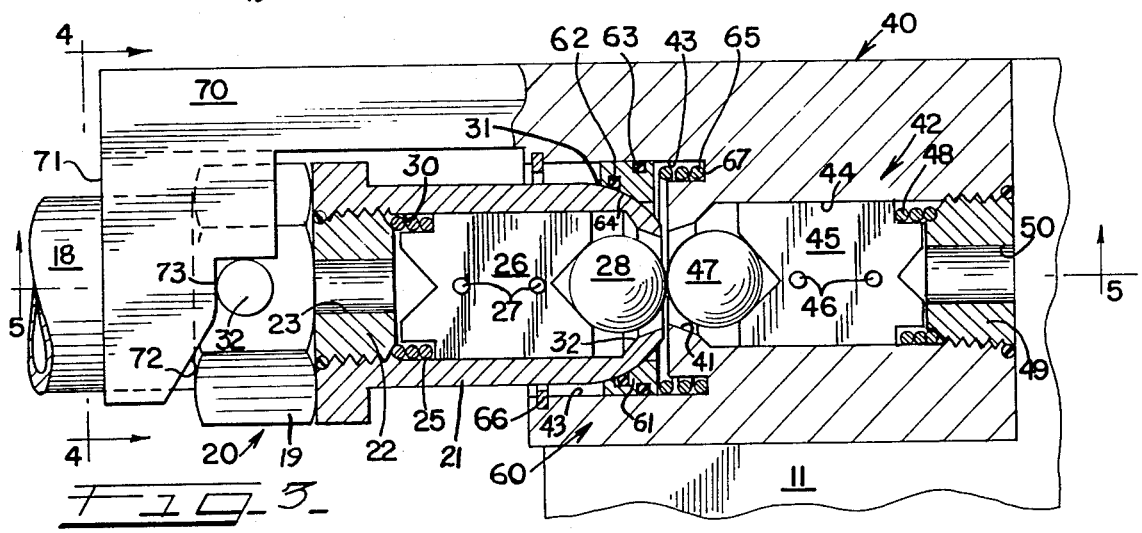
INVENTOR
VAUGHN A. NELSON

INVENTOR
VAUGHN A. NELSON
BY *Dorsey L. Baker*
ATT'Y.

FLUID LINE COUPLING

BACKGROUND OF THE INVENTION

Fluid line couplings have long been utilized to interconnect two fluid conduits together for the transmission of fluid therethrough, examples of such being illustrated by U.S. Pat. Nos. 2,675,829 and 3,130,749. A special utilization of such couplings exist in the automotive field in which a tractor is coupled to a trail behind device by a draft connection as well as a fluid conduit connection, the former utilized to provide motive power to the trailing device while the latter supplies hydraulic fluid, often under pressure, to drive a hydraulic ram or motor associated with the trail behind device. In connecting the fluid coupling, a difficulty may arise in that one of the valved coupling elements is under fluid pressure and excessive manual effort may be required to open this element. Also, while pulling the vehicle, the draft connection may become uncoupled and a high axial load on the fluid conduit causing same to rupture.

SUMMARY OF THE INVENTION

In order to overcome these difficulties, the instant invention utilizes an elongated telescopic type coupling in which a valved female portion carries a camming surface thereon adapted to be engaged by a cam means affixed to the male portion with subsequent simple motion upon the male coupling causing telescopic movement and opening of the valved conduits in both the male and female portions. Accordingly it is an object of the instant invention to provide a valved type fluid line coupling which may be interconnected even though fluid pressure exists in one of the coupling portions. Similarly it is an object of this invention to provide a fluid line coupling having a breakaway capability which precludes rupture of the fluid line in the event that a draft connection between the tractor and trail behind device becomes uncoupled. Finally it is an object of this invention to provide a very simple fluid line coupling in which interconnection may be effected by one-handed operation by moving either the male or female element in a unidirectional movement.

DESCRIPTION OF THE DRAWINGS

The manner in which these and other other objects of the invention is attained will be made clear by a consideration of the following specification and claims when taken in conjunction with the accompanying drawings in which:

FIG. 1 is an elevational view disclosing the subject matter of the instant invention employed in connection with a tractor for delivering fluid energy to a trail behind device;

FIG. 2 is a view taken partially in section through the longitudinal center line of the instant invention, with the interconnection of the fluid coupling parts about to take place;

FIG. 3 is a similar view in which interconnection of the coupling portions have been effected;

Figure 4:
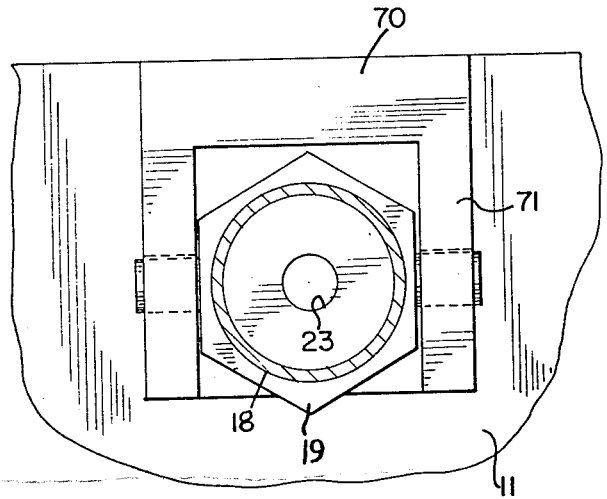
FIG. 4 is a rear elevational view of the subject matter of the instant invention.
Figure 5:
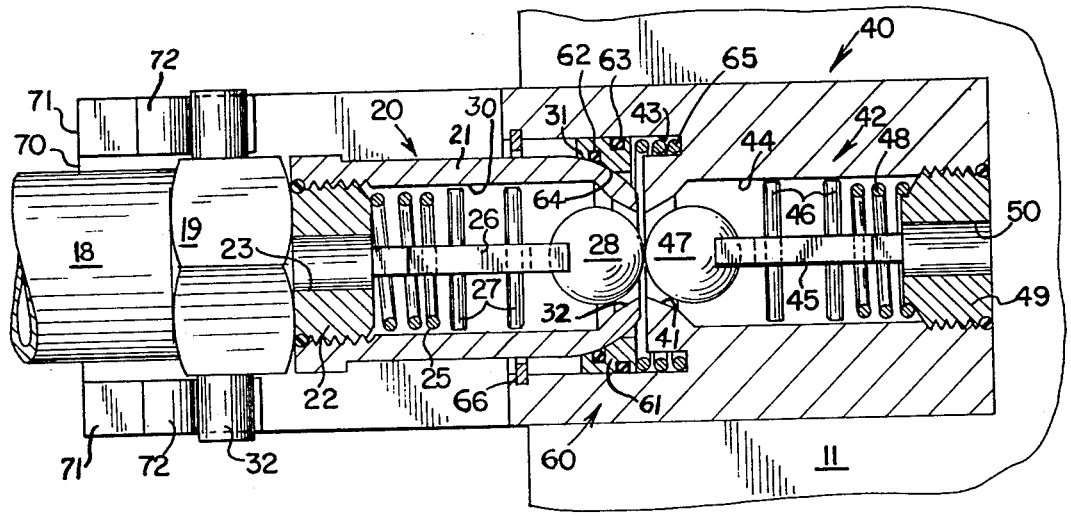
FIG. 5 is a view taken partially in section along the lines 5—5 of FIG. 3.

As disclosed in the preferred embodiment, the instant fluid line coupling is associated with a tractor 10, and a trail behind device 15 interconnected by draft connections 12 and 13 and a fluid line connection 16. As more clearly depicted in Figure 2 the instant invention utilizes a female housing 40 suitably attached (by a conventional means not shown) to the rear axle housing 11 of the tractor 10. A forward portion of the female housing 40 carries the valve section 42 which includes a fluid passage 44 interconnected to a source of fluid energy or a reservoir within the axle housing 11 by a bore 50 within a threaded insert 49. The rear end of fluid passage 44 forms a valve seat 41 for the valve element 47 which is urged into its seated position by a guide 45 and spring 48 which abuts the insert 49. Guide 45 may comprise a relatively flat metal plate having pins 46 extending therethrough to insure the guide maintains its proper attitude.

Rearwardly of the valve seat 41 is a chamber formed by counterbore 43 which carries a sealing means 60 reciprocable cable between a snap ring 66 and the forward end of the counterbore 43, with a spring 65 reacting against the forward wall of indentation 67 urging same rearwardly. This sealing or receiving means itself may be an annular collar 61 having seal 63 on its exterior wall to prevent the loss of fluid from between the collar and the counterbore 43 as well as a seal 62 on the inner surface of the collar. Additionally, a spherical internal surface 64 or other sealing configuration is adapted to be engaged with a mating surface 31 of male coupling part 20. Rearwardly of the valve section 42 is provided a camming section which includes a rearward extension 70, and two downwardly depending ears 71 carrying camming surfaces 72 and a locking surface 73.

The male portion 20 of the fluid line coupling includes an elongated housing 21 having a spherical external surface 31 at the forward end thereof for fitting the cooperative surface of sealing means 60, and is provided with a fluid passage 30 extending therethrough with a tapered surface 32 on the forward internal end thereof so as to form a valve seat for the valve element 28. A spring 25 abutting an insert 22 urges a valve guide 26 forwardly so as to seat the valve element 28. Similar to that of the female fluid conduit, the valve guide 26 may include a flat plate having pins 27 disposed perpendicular to its plane so as to maintain the guide in its proper juxtaposition within the bore. Further, insert 22 is provided with a fluid passage 23 therethrough for directing fluid through the conduit 16. Additionally, the male portion 20 may be connected to a rigid elongated tube 18 by forming insert 22 as a threaded extension thereto with the flexible fluid conduit 16 extending rearwardly therefrom. Cam means in the form of axially projecting pins 32 are carried by the male portion 20 and are adapted to engage the camming surfaces 72 whereby proper application of forces will cause the male member to reciprocate forwardly and cause the valve elements 28 and 47 to open one another.

Figure 6:
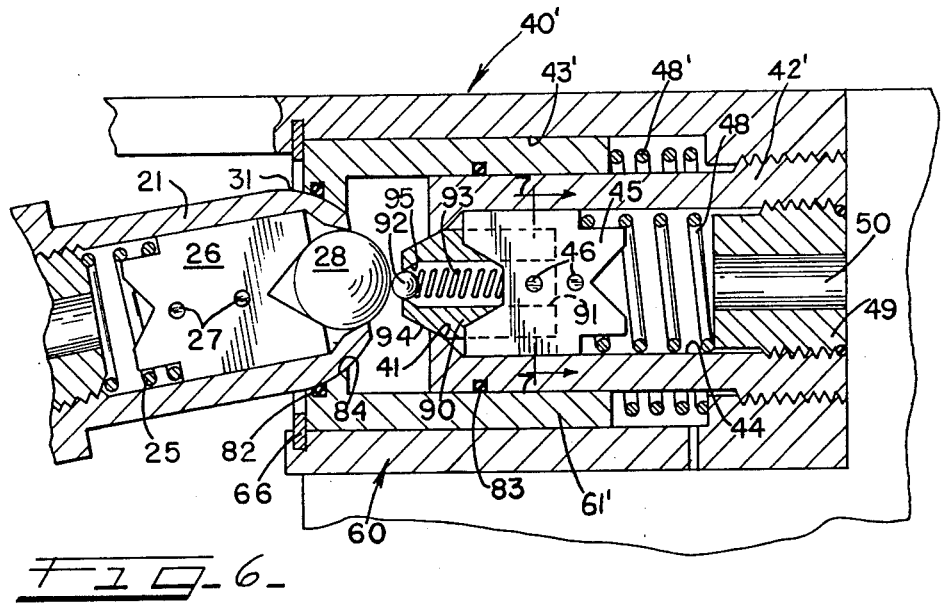
FIG. 6 is a view of an alternative coupling portion taken partially in section through the longitudinal center line of the instant invention similar to FIG. 2.
Figure 7:
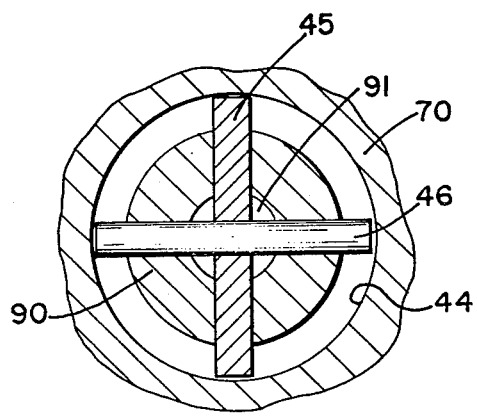
FIG. 7 is a sectional view taken along the lines 7—7 of Figure 6.

An alternative embodiment of the female portion is disclosed in FIGS. 6 and 7 which involve changes in the sealing means 60 and valve element 47 so as to permit interconnection of the male and female portions with even less manual effort. In this embodiment, female portion 40' has an enlarged internal diameter 43' and receives an elongated annular valve housing or element 42'. Between the external diameter of the valve element 42' and the internal diameter 43' is an elongated reciprocal sealing means 61' having less internal surface area exposed to fluid pressure than element 60 of FIGS. 2–5. This sealing means is urged rearwardly by spring 48' and is provided with seals 82 and 83 which preclude loss of hydraulic fluid upon coupling and uncoupling. To even further reduce the manual effort required for coupling, a pilot actuated valve element is provided and such takes the form of an insert 90 having a bore 91 therethrough and a sealing surface 94 to mate with valve seat 41. Within bore 91 is a pilot ball element 92 which is urged forwardly by a spring 93 to seal a second valve seat 95. For convenience, valve guide 45 may enter an elongated slot in insert 90 with the two being fixed together by pin 46 passing therethrough. Appropriately the forward portion of valve guide 45 serves as an abutting surface for the spring 93.

MODE OF OPERATION

In order to interconnect the flexible fluid conduit 16 to a source of fluid energy upon the tractor 10, the operator of the vehicle, after connecting the draft connections 12 and 13, may merely grasp the metal conduit 18 at its rear end and insert spherical surface 31 adjacent a spherical sealing surface 64. By utilizing this surface as a fulcrum, the operator can utilize the leverage provided by the metal conduit 18 and urge the lever upward whereby the coaction of the camming means 32 and the camming surface 72 will cause forward longitudinal movement of the male portion 20, such movement being effective to cause valve elements 28 and 47 to unseat one another. Sufficient vertical movement of the lever will cause the camming means 32 to rest adjacent the locking surface 73 as depicted in FIG. 3 in which the valve elements 28 and 47 are open, valve guides 26 and 47 abut inserts 22 and 49 to provide a fixed open position of the valve elements and fluid may freely pass between the male and the female portions. Thus, the lever in the form of a metal conduit, together with the camming means 32 and camming surface 72 and sealing means 60 may provide a sufficient moment arm whereby an operator may overcome any pressure existing either in fluid passage 44 or 30 which might otherwise tend to preclude interconnection of the couplings and opening of the valve elements 28 and 47. It should be appreciated that the pitch of the camming surface 72 is quite high, and a small vertical movement of the cam means 32 upwardly should cause a sufficient longitudinal movement of the male element 20 as to cause valve elements 28 and 47 to unseat one another. Further, it should be noted that a completely sealed interconnection is effected as soon as the cooperative camming means (32 and 37) provide any degree of longitudinal movement of male portion 20. This forward motion, opposed by spring 65 results in a sealing engagement between surfaces 31 and 64, such sealing thereby being effected prior to engagement or opening of either valve element 28 or 47. Consequently no fluid is lost as coupling is effected.

With respect to the embodiment of the female portions 6 and 7, interconnection of a fluid coupling 16 to the source of fluid energy takes place in an identical manner. However, in this embodiment, should fluid energy exist within the female housing, or bore 44, it will be seen that the male valve element 28 will first open a pilot operated ball element 92 prior to opening the primary flow path through the bore 44. This opening of the small valve element 92 will permit some fluid flow through the female coupling element, and such flow will reduce any pressure which might exist in bores 44 and 50 of the female coupling element 42' due to any trapped volume of fluid between this element 42' and its source of fluid energy. Since a smaller force is required to open element 92, it will normally open prior to element 28 so as to reduce the pressure within coupling element 42' and thus reduce the force required to effect the interconnection. Additionally it will be observed that once fluid energy is discharged into the chamber formed by the internal diameter of the sealing means 61', and the two valve coupling elements, fluid pressure will create a force to resist further coupling of the male and female elements. However in comparing the embodiment of FIG. 6 and 7 with that of FIG. 2, it will be observed that on the forward side of the surface area sealing means 61' exposed to fluid pressure as coupling just commences is less in the alternative embodiment than it is in the principal embodiment and the force resisting coupling is therefore less. Thus where high pressures are involved in the internal bores of the female element, the embodiment of FIG. 6 may be preferable to facilitate manual coupling.

In order to provide a breakaway feature for the instant invention, it is only necessary to properly adjust the position or angle of the camming surface 72 in proper juxtaposition with the fluid line coupling 16 in its taut condition. With respect to the instant disclosure, the female portion 40 has been provided on top of the axle housing 11, while the rear end of the flexible line coupling 16 is at a lower elevation with respect thereto. Thus as disclosed in FIG. 1, should the draft connection 11, 13 be disconnected, the conduit 16 will assume the dotted line position and exert a downward force on the rear end of lever or metal conduit 18. Such downward force will be sufficient to move the cam means 32 off of the locking surface 73 and down the cam surface 72, thus permitting the male portion to disassociate itself with the female portion and valve elements 28 and 47 may be returned to their closed position by virtue of the springs 25 and 48. Although the female portion has herein been disclosed in a substantially horizontal attitude, the primary requirement in obtaining a breakaway coupler is to attach the coupling to the tractor device whereby the flexible line conduit, when taut, will cause the camming means 32 to move off the locking surface 73 of the cam means 71 and down the camming surface 72.

Thus it should be appreciated that the instant invention proposes a valved fluid line coupling which may be coupled under pressure and which is capable of a breakaway function. Further a comparison of the instant device with those noted in reference to the discussion of the prior art, it will be seen that the invention herein disclosed is far simpler in design and yet capable of all of the advantages therein. Additionally the instant invention is susceptable of one-handed operation and provides a great deal of leaverage for coupling under pressure. It should be further understood that the instant disclosure may be modified and that the valved elements and valve element guides may be easily substituted for, the coupling being susceptable of many arrangements upon a tractor so as to provide a very neat appearance.

I claim:

1. A fluid line coupling comprising:
   a. female housing means including a valved conduit and a camming surface;
   b. reciprocable sealing means carried by said female portion and having a surface adapted to sealingly receive a male portion; and
   c. male coupling means including a valved conduit and a cam means, said cam means and said cam surface cooperative to effect coupling of said male and female portions, and opening of said valved conduit means in response to straight-line movement in a vertical plane of the male means relative to the female means.

2. An apparatus as recited in claim 1 in which:
   a. said female housing includes a chamber adjacent said valved conduit means; and
   b. said reciprocable sealing means reciprocates within said chamber.

3. An apparatus as recited in claim 2 in which said sealing means comprises:
   a. an annular insert having an aperture therethrough;
   b. sealing means interposed between said chamber walls and said insert; and
   c. a sealing surface adapted to sealingly receive the male portion.

4. A fluid line coupling comprising:
   a. a female portion having a valved element
   b. a male portion having a valved element therein;
   c. cooperative camming means on said male and female portions for effecting interconnection of said male and female portions and opening of said valve elements, said camming means being operable in response to relative straight-line movement within a given plane between said portions; and
   d. reciprocable sealing means carried by one of said coupling portions for sealingly engaging both portions throughout interconnecting movement thereof.

5. An apparatus as recited in claim 4 in which said female portion comprises:
   a. an elongated housing, one end thereof containing said valved conduit means and the other end carrying said camming surface.

6. An apparatus as recited in claim 4 in which:
   a. said female portion includes a chamber adjacent said valved element; and
   b. said reciprocable sealing means reciprocates within said chamber.

7. An apparatus as recited in claim 6 in which said sealing means comprises:
   a. an annular insert having an aperture therethrough;
   b. sealing means interposed between said chamber walls and said insert; and c. a sealing surface adapted to sealingly engage the male portion.

8. A fluid line coupling comprising:
a female housing means including a conduit and a sealing means;
said sealing means including a spherical concave surface;
a first valve means normally biased to a closed position for retaining pressure fluid within the conduit;
a second valve means normally biased to a closed position and having an area smaller than said first valve means in communication with the fluid pressure; and
a male coupling means having a spherical convex surface on the free end thereof and sealingly engageable with said sealing means and, upon relative movement of the male means towards said female means said male means first sealingly engages said sealing means, then unseats said second valve means and finally unseats said first valve means.

9. A fluid line coupling according to claim 8, wherein said male means includes a third valve means normally biased to a closed position, but which opens concomitant with the opening of said second valve means.

10. A fluid line coupling according to claim 9 wherein the engagement of said male means with said sealing means forms a sealed chamber between said first and third valve means, and the opening of said second valve means admits pressure fluid into said chamber, whereby the pressure fluid assists in opening said first and third valve means.

11. A fluid line coupling according to claim 10, and further comprising:
a camming surface on one of said male and female means;
cam means on the other of said last mentioned means; and
said camming surface and cam means being arranged so that, with the male means in engagement with said sealing means, movement of one of said male and female means in a vertical plane first causes the second valve means to open and then both said first and third valve means to open.

12. A female coupling member capable of engagement with a male coupling member having a spherical convex surface on the free end thereof and camming means for completing a hydraulic line comprising:
a housing means having one end capable of connection with a portion of the hydraulic line;
a valve means within the housing means and normally biased to a closed position;
a spherical concave surface formed on the housing means and capable of sealing engagement with said convex surface with the male and female members in aligned position;
an extension on the upper side of said housing on the end opposite said one end and extending beyond said convex surface; and
a downward depending camming surface formed on the free end of said extension and capable of engagement by said camming means, said male and female members being out of axial alignment with the camming means in initial engagement with the camming surface, said concave and convex surfaces being capable of sealing engagement with said members in said last-mentioned position and said sealing engagement is maintained as said members are moved toward their axial aligned position,
whereby said extension and said camming surface protects said female member when said members are uncoupled and said camming surface cooperates with said camming means to effect coupling of said members.

* * * * *